April 19, 1960

C. L. SPORCK ET AL 2,932,890

METAL WORKING

Filed Jan. 31, 1955

INVENTORS
Claus L. Sporck
Bernard Sassen
BY
Synnestvedt & Lechner
ATTORNEYS

United States Patent Office 2,932,890
Patented Apr. 19, 1960

2,932,890

METAL WORKING

Claus L. Sporck and Bernard Sassen, Cincinnati, Ohio, assignors to The Lodge & Shipley Company, Cincinnati, Ohio, a corporation of Ohio Application January 31, 1955, Serial No. 485,220

3 Claims. (Cl. 29—554)

This invention relates to the manufacture of hollow, generally conical-shaped articles from sheet metal blanks and, in particular, relates to the manufacture of charge-shaping cones for use in ordinance projectiles. In the preferred practice of the present invention, certain procedures disclosed in copending application of Claus L. Sporck entitled Methods for Working Sheet Metal, filed January 29, 1954, and having Serial No. 407,010 now abandoned, are utilized in a manner to secure novel and advantageous results in the over-all process as herein disclosed.

While the invention herein will be described principally in connection with charge-shaping cones, it will be apparent as the description proceeds that other types of generally similar articles can be produced in accordance with the invention.

Charge-shaping cones of the kind in question are generally funnel-shaped in the sense that they have a generally conical portion and a generally tubular portion extending away from the apex of the conical portion. Heretofore, charge-shaping cones have been manufactured as generally outlined as follows. First, a flat, circular disk is stamped or cut from sheet stock and then this disk is axially displaced into a generally frusto-conical-shaped object by a machine such as disclosed in the publication "Design News," pages 24 and 25, June 1951, or in the publication "American Machinist," pages 114 and 115, December 25, 1950. A press operation is then performed on the object so as to work the metal at the apex into tubular form.

One of the disadvantages of the above-mentioned technique is that there is a considerable amount of excess metal required to produce the ultimate cone. For example, the disks are formed from sheet metal and, therefore, the metal immediately surrounding the disk becomes waste or scrap. Even if it were practical to form the disk from a square sheet having sides of a dimension equal to the diameter of the disk, something in the order of 50% of the total metal required becomes scrap. In the event the cone were formed from a square blank, a subsequent trimming operation would be necessary. Since the cones are ordinarily made of copper, the wastage is wholly undesirable from the economic standpoint.

The principal object of the present invention is to provide methods and apparatus for the manufacture of cones of the kind mentioned which enables a saving in total metal required in the order of 50 to 70% over such articles made by prior methods.

The details of the invention and certain advantages thereof will be apparent from the following description and drawings wherein.

Figure 1:
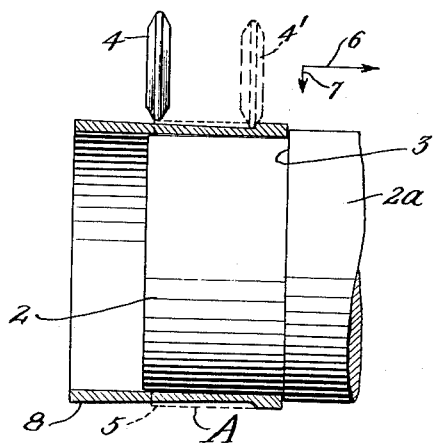
Figure 1 is a view partially in section illustrating one way in which a generally tubular blank having walls of tapering thickness can be manufactured.

The initial step in the manufacture of cones of the kind in question is in the formation of a generally tubular blank whose sides have a tapering thickness. The preferred manner of accomplishing this will be explained in connection with Figure 1.

First, a generally tubular-shaped article whose sides have a predetermined length and are of known wall thickness is formed. Such an article is illustrated by the dotted lines A and may be made by cutting a section from standard copper tubing or from a flat sheet wrapped up and joined as by brazing or the like. This article is then placed on a mandrel or spindle 2, the spindle being provided with a back-up section 2a, which forms an annular ledge 3. The spindle is rotated and a roller 4 is made to engage the outer end of the object, for example, as indicated at 5, and then moved axially of the spindle in the direction shown by the arrows 6 and simultaneously moved radially of the spindle as indicated by the arrows 7. Since the article is held on the ledge 3, the metal is caused to extrude outwardly from the spindle as indicated at 8. A typical roller position during this operation is indicated at 4'.

Figure 2:
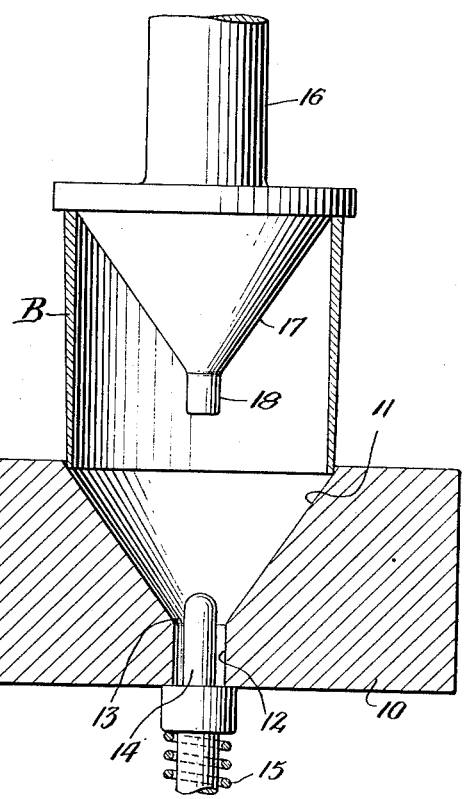
Figures 2 and 3 are views partially in section and illustrate a die arrangement in a press for shaping or forming the blank of Figure 1 into a generally funnel-shaped object.

When the roller has moved to the position of the ledge 3, a blank B such as shown in Figure 2 is completely formed. The height of the ledge is made to be about equal or preferably slightly less than the final reduced thickness of the blank. In some instances, the height of the ledge 3 may be slightly greater than the finished thickness, and in this event, the roller can be stopped just short of the ledge and a small amount of metal trimmed from the blank.

It will be apparent that there are other ways in which a blank B can be formed. However, the above is preferred because waste is eliminated or at least reduced to an absolute minimum. In a great majority of cases, no trimming is required and, therefore, all the metal in the original article is present in the finished blank. While the above has been described in connection with the use of one roller, it will be apparent that a plurality of rollers located at spaced points around the periphery of the spindle may be used.

In the operation described, some swedging of the metal may take place and in certain instances it may be desirable to anneal the blank before the next operation.

The next step in the process of the invention is to form the blank B into a generally conical-shaped object and preferably into a generally funnel-shaped object. This will be explained in connection with Figures 2 and 3.

In Figure 2 the lower die 10 has a conical portion 11 and a cylindrical portion or passage 12 extending downwardly or away from the apex 13. A plunger 14 is disposed centrally of the portion 12 and is yieldably held in the position shown as by the spring 15. The upper die 16 has a conical portion 17 and a generally cylindrical or shaft-like portion 18. The cylindrical and conical portions of the upper and lower dies are, of course, arranged and constructed to match or mate with one another.

Figure 3:
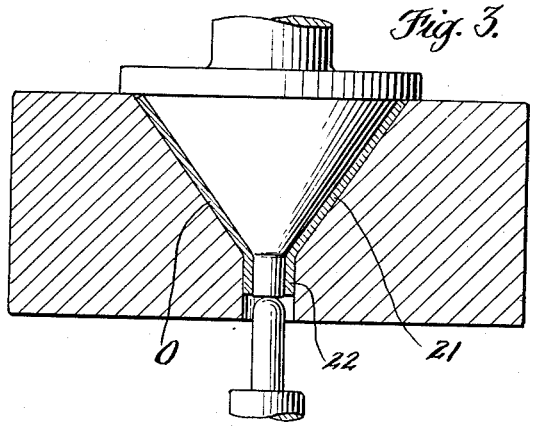

The blank B is placed between the dies as shown in Figure 2 and the upper die 16 moved downwardly so that the blank is forced into the conical portion and into the cylindrical portion 12 so that a funnel-shaped object O is formed as indicated in Figure 3. It should be noted that the above-described operation forms the object O so that the sides of the conical portion 21 and cylindrical portion 22 are of substantially uniform thickness.

The purpose of the plunger 14 is to guide the metal of blank B (as it is forced along the conical surface 11) into the cylindrical passage 12 of die 10 in the event the flow of said metal precedes the entry of portion 18 of die 16 into said passage 12.

The next step in the process is to axially displace the conical portion 21 of the object O. This is accomplished in accordance with the teachings in copending application Serial No. 407,010 now abandoned and reference may be made to that application for details. Typical machines for carrying out this step are shown in copending application of Bernard Sassen and Claus L. Sporck entitled Metal Working, filed September 9, 1954, and having Serial No. 454,871, and copending application of Claus L. Sporck and Bernard Sassen, Serial No. 490,792, filed February 28, 1955.

The object O is placed on the spindle 23 having a conical surface 24 and a cylindrical surface 24', whose included angle X is somewhat smaller than the included angle Y of the conical portion 21. The spindle is rotated and the roller 25 is made to move from the point 26 (junction of the portions 21 and 22) in a direction indicated by the arrow 27 along a path parallel to the surface 24 of the spindle to axially displace the metal.

Figure 5:
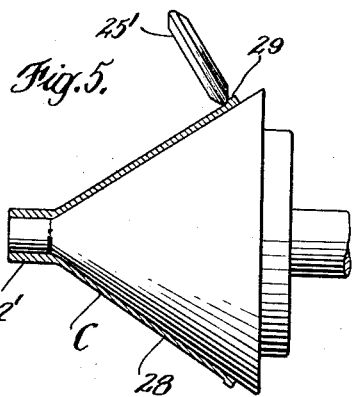

This operation forms the cone C as indicated in Figure 5, the sides of the conical portion 21 of the object O being made to conform to the surface of the spindle and being elongated and reduced in thickness to form the conical portion 28 of the cone. The tubular portion 22' corresponds to the tubular portion 22 of the object O. As is explained more in detail in above referred to application 407,010, the thickness $T_2$ of the sides of the portion 28 is equal to $T_1 = \sin \beta / \sin \alpha$, where $T_1$ is the thickness of the side of the portion 21, $\beta$ is one-half angle X, and $\alpha$ is one-half angle Y. Thus, the side of the section 21 is reduced in accordance with the ratio $\sin \beta / \sin \alpha$.

The position of the roller 25' in Figure 5 is just before the conical portion 28 is completely formed. The portion indicated at 29 will be displaced as the roller continues to move along the surface of the spindle.

In some instances a rotatable tail stock which may take the form of a back-up member or of a chuck can be used for holding the portion 22 on the cylindrical surface 24' during the rolling operation.

Figure 4:
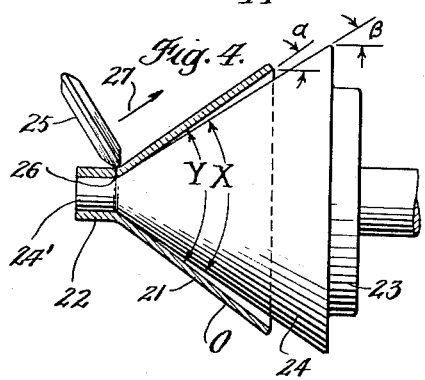
Figures 4 and 5 are views partially in section illustrating the manner in which the object of Figure 3 is axially displaced into a charge-shaping cone.

The step of elongating and reducing the thickness of the sides of the object O as mentioned in connection with Figures 4 and 5 is important in the over-all process. For example, the grain structure of the sides 28 of the cone C is generally helically oriented and this imparts very high strength. Where the article A is made from flat sheet which is wrapped up and joined, this step works the joint in a manner such that the joint becomes integrated with the rest of the metal and essentially a continuous structure is presented. In addition, the thickness and included angle of the sides of the cone can be held within very close tolerances by means of this step.

We claim:

1. The method of making a charge-shaping cone or the like comprising the steps: forming a generally tubular-shaped blank whose sides have a tapering thickness; forming said blank into an object having a conical-shaped portion, the sides of which have a known included angle and are of substantially uniform thickness; and, by the use of a roller and a spindle having a conical-shaped portion whose included angle is less than first said included angle, axially displacing said conical-shaped portion of the blank along the conical-shaped portion of the spindle whereby the sides are reduced in thickness and elongated, said reduction being in accordance with the ratio $\sin \beta / \sin \alpha$, where $\beta$ is one-half the included angle of the conical-shaped portion of the spindle and $\alpha$ is one-half the included angle of said conical-shaped portion of the object.

2. The method of making a charge-shaping cone or the like comprising the steps: forming a generally tubular-shaped blank whose sides have a tapering thickness; forming said blank into an object having a conical-shaped portion, the sides of which have a known included angle, and also having a tubular-shaped portion extending away from the apex of the cone, the sides of each portion being of substantially uniform thickness; and, by the use of a roller and a spindle having a conical-shaped portion whose included angle is less than first said included angle, axially displacing said conical-shaped portion of the object along said conical-shaped portion of the spindle whereby the sides are reduced in thickness and elongated said reduction being in accordance with the ratio $\sin \beta / \sin \alpha$, where $\beta$ is one-half the included angle of the conical-shaped portion of the spindle and $\alpha$ is one-half the included angle of said conical-shaped portion of the object.

3. The method of making a charge-shaping cone or the like comprising the steps: placing a generally tubular-shaped article on a mandrel in abutting relationship with a shoulder on the mandrel and, using a roller, moving the roller towards said shoulder and towards the axis of the mandrel to elongate the article and taper the outer portion of the sides; by the use of a matched die having conical-shaped portions and cylindrically-shaped portions, forming said elongated article into an object having a conical-shaped portion and a tubular-shaped portion extending away from the apex of the cone, the sides of the conical portion being of substanitally uniform thickness and having a known included angle; and placing said conical-shaped portion on a spindle having a conical surface whose included angle is less than first said included angle, rotating the spindle and, by the use of a roller, axially displacing the conical portion whereby the sides are reduced in thickness and elongated and conform to the surface of the spindle said reduction being in accordance with the ratio $\sin \beta / \sin \alpha$, where $\beta$ is one-half the included angle of said conical surface of the spindle and $\alpha$ is one-half the included angle of said conical-shaped portion of the object.

References Cited in the file of this patent

UNITED STATES PATENTS

| | | |
|---|---|---|
| 1,939,356 | Lindgren | Dec. 12, 1933 |
| 1,966,713 | Flint | July 17, 1934 |
| 2,465,884 | Koppel | Mar. 29, 1949 |

FOREIGN PATENTS

| | | |
|---|---|---|
| 436,768 | Great Britain | Oct. 17, 1955 |